(12) United States Patent
Li et al.

(10) Patent No.: US 11,286,731 B1
(45) Date of Patent: Mar. 29, 2022

(54) PIPE RACKING SYSTEM

(71) Applicant: SICHUAN HONGHUA PETROLEUM EQUIPMENT CO., LTD., Guanghan (CN)

(72) Inventors: Ying Li, Guanghan (CN); Xiaohu Li, Guanghan (CN); Lin Wang, Guanghan (CN); Xiaowu Ou, Guanghan (CN); Aimin Tang, Guanghan (CN); Qionghua Yang, Guanghan (CN); Junqing Chai, Guanghan (CN); Yan Lyu, Guanghan (CN)

(73) Assignee: SICHUAN HONGHUA PETROLEUM EQUIPMENT CO., LTD., Guanghan (CN)

( * ) Notice: Subject to any disclaimer, the term of this patent is extended or adjusted under 35 U.S.C. 154(b) by 0 days.

(21) Appl. No.: 17/463,563

(22) Filed: Sep. 1, 2021

(51) Int. Cl.
*E21B 19/14* (2006.01)
*B25J 15/08* (2006.01)
*E21B 19/15* (2006.01)
*B25J 5/00* (2006.01)
*B25J 9/16* (2006.01)
*B25J 5/02* (2006.01)

(52) U.S. Cl.
CPC .............. *E21B 19/155* (2013.01); *B25J 5/007* (2013.01); *B25J 5/02* (2013.01); *B25J 9/1697* (2013.01); *B25J 15/08* (2013.01)

(58) Field of Classification Search
CPC .. E21B 19/155; B25J 5/007; B25J 5/02; B25J 9/1697; B25J 15/08
USPC ................................ 175/85; 294/198, 102.2
See application file for complete search history.

(56) References Cited

U.S. PATENT DOCUMENTS

| | | | | |
|---|---|---|---|---|
| 4,345,864 A | * | 8/1982 | Smith, Jr | E21B 19/14 414/22.63 |
| 6,270,136 B1 | * | 8/2001 | Dagenais | E21B 19/163 294/207 |
| 7,032,678 B2 | * | 4/2006 | Mosing | E21B 19/06 166/380 |
| 7,178,612 B2 | * | 2/2007 | Belik | E21B 19/00 175/162 |
| 8,011,426 B1 | * | 9/2011 | Orgeron | E21B 19/155 166/85.1 |
| 8,291,566 B2 | * | 10/2012 | Ushio | B25J 5/02 29/407.08 |

(Continued)

FOREIGN PATENT DOCUMENTS

| | | |
|---|---|---|
| CN | 112647669 A | 4/2021 |
| CN | 213381596 U | 6/2021 |

*Primary Examiner* — Paul T Chin
(74) *Attorney, Agent, or Firm* — Metis IP LLC

(57) ABSTRACT

A pipe racking system includes a diving board having a guide rail, a trolley, a manipulator, and a gripper. The trolley has two sides being mounted to the diving board via the guide rail and being driven by a rack and pinion member. The gripper is connected to an end of the manipulator away from the trolley. The trolley includes two pairs of combined bearings and two pairs of eccentric wheels. The gripper is configured to grip a tubular subject and include two opposing flippers, two first electric putters, and two springs. The two first electric putters is configured to control the two flippers. One end of each spring of the two springs is connected to a flipper of the two flippers and the other end of the each spring is connected to a push rod of a first electric putter of the two first electric putters.

20 Claims, 16 Drawing Sheets

(56) References Cited

U.S. PATENT DOCUMENTS

| | | | | |
|---|---|---|---|---|
| 9,476,925 | B2 * | 10/2016 | Duchesne | G01R 29/0892 |
| 10,465,455 | B2 | 11/2019 | Berry et al. | |
| 10,612,322 | B2 * | 4/2020 | Doyon | E21B 19/155 |
| 10,661,450 | B2 * | 5/2020 | Miyazaki | B25J 9/142 |
| 11,167,421 | B2 * | 11/2021 | Sinnet | A23L 5/11 |
| 2016/0060979 | A1 * | 3/2016 | Magnuson | E21B 19/14 |
| | | | | 414/22.63 |
| 2018/0328112 | A1 * | 11/2018 | Berry | E21B 19/08 |
| 2019/0106950 | A1 * | 4/2019 | Alvaer | E21B 3/06 |
| 2019/0316421 | A1 | 10/2019 | Luo et al. | |

* cited by examiner

PIPE RACKING SYSTEM

TECHNICAL FIELD

The disclosure generally relates to pipe racking systems.

BACKGROUND

Pipe racking systems, which are designed for automatically transporting tubular subjects, are widely used in the exploration of oil, gas, and geothermal energy, etc. It is desirable to develop safe, reliable, and efficient pipe racking systems.

SUMMARY

According to an aspect of the present disclosure, a pipe racking system may be provided. The pipe racking system may include a diving board, a trolley, a manipulator, and a gripper. The diving board may have a guide rail. The trolley may have two sides being mounted to the diving board via the guide rail and being driven by a rack and pinion member. The trolley may include two pairs of combined bearings and two pairs of eccentric wheels. Each pair of combined bearings may be positioned on each of the two sides of the trolley. Each of the two pairs of combined bearings may contact an upper surface and a side surface of the guide rail. Each pair of eccentric wheels may be positioned on each of the two sides of the trolley. Each of the two pairs of eccentric wheels may contact a lower surface of the guide rail. The manipulator may be connected to the trolley. The gripper may be connected to an end of the manipulator away from the trolley and configured to grip a tubular subject. The gripper may include two opposing flippers, two first electric putters, and two springs. Threshold two first electric putters may be configured to control the two flippers. One end of each spring of the two springs may be connected to a flipper of the two flippers and the other end of each spring may be connected to a push rod of a first electric putter of the two first electric putters.

In some embodiments, the manipulator may include a back arm, a front arm, and a second electric putter. The front arm may be connected to the back arm and the gripper. The second electric putter may be connected to the front arm and the back arm. An end of the second electric putter may connect to a main back arm of the back arm and the other end of the second electric putter connect to a main front arm of the front arm.

In some embodiments, the connection between the front arm and the back arm via the second electric putter and the connection between the gripper and the front arm may be configured to limit the gripper to move parallel to the diving board.

In some embodiments, the gripper may be connected to the front arm through four pin shafts.

In some embodiments, the diving board may be retractable.

In some embodiments, the pipe racking system may further include a drag chain and a retractable pallet. The drag chain may be connected to the diving board and the trolley. The drag chain may be configured to guide and protect cables connected to the trolley. The retractable pallet may be configured to support part of the drag chain.

In some embodiments, the manipulator may be bolted to the trolley.

In some embodiments, a rotation of the manipulator may be driven by a slewing mechanism.

In some embodiments, the pipe racking system may further include at least one image sensor for capturing an image of a movable component of the pipe racking system and at least one processor for determining a state of the movable component.

In some embodiments, the pipe racking system may further include at least one storage device for storing the image or the state of the movable component.

In some embodiments, the pipe racking system may further include at least one control device for controlling at least one motor. The at least one motor may control a movement of the movable component based on the state of the movable component.

In some embodiments, the movable component of the pipe racking system may include at least one of the gripper, the manipulator, the trolley, or a clamp assembly of the gripper. The clamp assembly may include two fingers. The two fingers and the two opposing flippers may be configured to grip the tubular subject.

In some embodiments, the at least one motor may include at least one of the first electric putter, the second electric putter, a first actuating motor for controlling a rotation of the manipulator, a second actuating motor for controlling a movement of the trolley, or a third actuating motor for controlling a distance between the two fingers of the clamp assembly.

In some embodiments, the pipe racking system may further include a transport support assembly for debug and transport the pipe racking system.

In some embodiments, the trolley may be configured to arrive at four positions of the diving board. The four positions may include a maintenance position for maintaining the pipe racking system, a transport position for transporting the pipe racking system, a waiting position for waiting to work, and a work position for gripping and transporting the tubular subject.

According to another aspect of the present disclosure, a pipe racking system may be provided. The pipe racking system may include a diving board, a trolley, a manipulator, a gripper, at least one image sensor for capturing an image of a movable component of the pipe racking system, and at least one processor for determining a state of the movable component. The diving board may have a guide rail. The trolley may have two sides being mounted to the diving board via the guide rail. The trolley may include two pairs of combined bearings and two pairs of eccentric wheels. Each pair of combined bearings may be positioned on each of the two sides of the trolley. Each of the two pairs of combined bearings may contact an upper surface and a side surface of the guide rail. Each pair of eccentric wheels may be positioned on each of the two sides of the trolley. Each of the two pairs of eccentric wheels may contact a lower surface of the guide rail. The manipulator may be connected to the trolley. The manipulator may include a back arm, a front arm, and a first electric putter. The front arm may be connected to the back arm and the gripper. The first electric putter may be connected to the front arm and the back arm. An end of the first electric putter may connect to a main back arm of the back arm and the other end of the second electric putter may connect to a main front arm of the front arm. The gripper may be connected to an end of the manipulator away from the trolley and configured to grip a tubular subject. The gripper may include two opposing flippers, two second electric putters, and two springs. Two second electric putters may be configured to control the two flippers. One end of each spring of the two springs may be connected to a flipper of the two flippers and the other end of each spring may be connected to a push rod of a second electric putter of the two second electric putters. The connection between the front arm and the back arm via the first electric putter and the connection between the gripper and the front arm may be configured to limit the gripper to move parallel to the diving board.

According to yet another aspect of the present disclosure, a drill system may be provided. The drill system may include a pipe racking system. The pipe racking system may include a diving board, a trolley, a manipulator, and a gripper. The diving board may have a guide rail. The trolley may have two sides being mounted to the diving board via the guide rail and being driven by a rack and pinion member. The trolley may include two pairs of combined bearings and two pairs of eccentric wheels. Each pair of combined bearings may be positioned on each of the two sides of the trolley. Each of the two pairs of combined bearings may contact an upper surface and a side surface of the guide rail. Each pair of eccentric wheels may be positioned on each of the two sides of the trolley. Each of the two pairs of eccentric wheels may contact a lower surface of the guide rail. The manipulator may be connected to the trolley. The gripper may be connected to an end of the manipulator away from the trolley and configured to grip a tubular subject. The gripper may include two opposing flippers, two first electric putters, and two springs. Threshold two first electric putters may be configured to control the two flippers. One end of each spring of the two springs may be connected to a flipper of the two flippers and the other end of each spring may be connected to a push rod of a first electric putter of the two first electric putters.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

Figure 1:
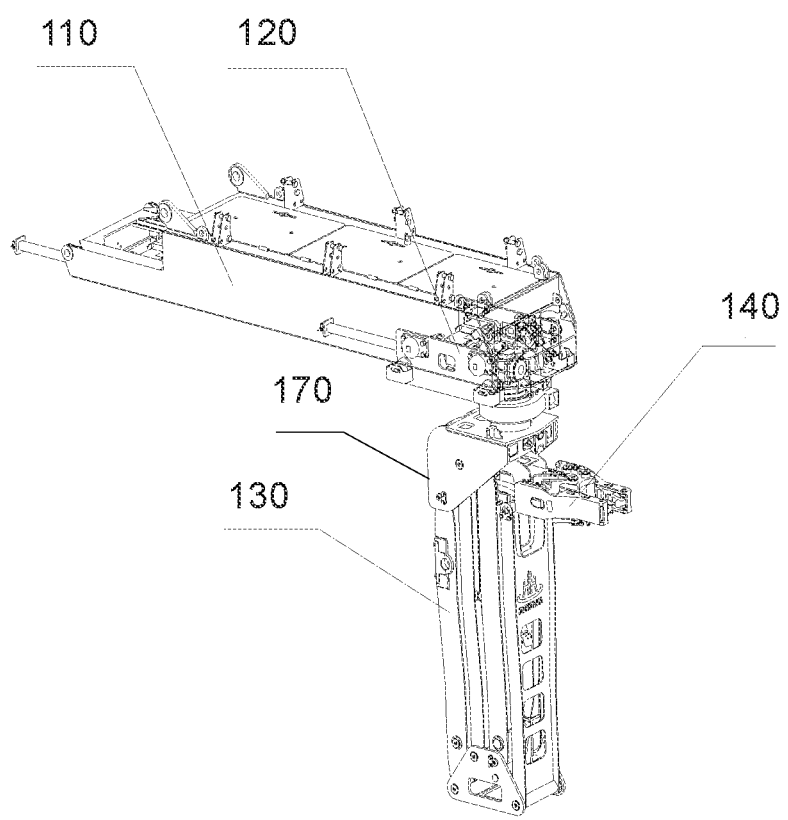
FIG. 1 illustrates an exemplary pipe racking system according to some embodiments of the present disclosure.

The following description is presented to enable any person skilled in the art to make and use the present disclosure and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an erasable programmable read-only memory (EPROM). It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that the term "system," "engine," "unit," "module," and/or "block" used herein are one method to distinguish different components, elements, parts, sections or assembly of different levels in ascending order. However, the terms may be displaced by another expression if they achieve the same purpose.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

An aspect of the present disclosure relates to a pipe racking system. The pipe racking system may include a diving board, a trolley, a manipulator, and a gripper. The diving board may have a guide rail. The trolley may be mounted to the diving board via the guide rail, and be driven by a rack and pinion member. The manipulator may be connected to the trolley. The gripper may be connected to an end of the manipulator away from the trolley. The trolley may include two pairs of combined bearings and two pairs of eccentric wheels. Each pair of combined bearings may be positioned on each of two sides of the trolley. Each of the two pairs of combined bearings may contact an upper surface and a side surface of the guide rail. Each pair of eccentric wheels may be positioned on each of the two sides of the trolley. Each of the two pairs of eccentric wheels may contact a lower surface of the guide rail. The gripper may be configured to grip a tubular subject and include two opposing flippers, two first electric putters, and two springs. The two first electric putters may be configured to control the two flippers. One end of each spring of the two springs may be connected to a flipper of the two flippers and the other end of the each spring may be connected to a push rod of a first electric putter of the two first electric putters. In this way, a safe, reliable, and efficient pipe racking system is provided.

Figure 2:
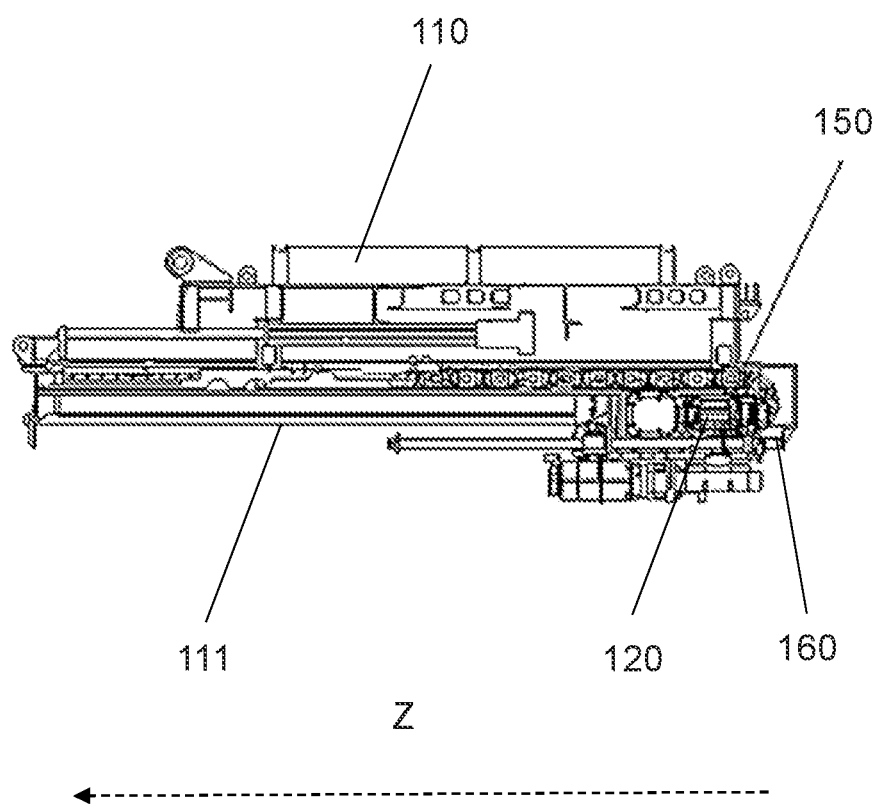
FIG. 2 illustrates an exemplary diving board and an exemplary trolley according to some embodiments of the present disclosure.

FIG. 1 illustrates an exemplary pipe racking system 100 according to some embodiments of the present disclosure. As shown in FIG. 1, the pipe racking system 100 may include a diving board 110, a trolley 120, a manipulator 130, and a gripper 140. FIG. 2 illustrates an exemplary diving board 110 and an exemplary trolley 120 according to some embodiments of the present disclosure.

The diving board 110 may be configured to support the movement of the trolley 120. As shown in FIG. 2, the diving board 110 may include a guide rail 111 along a horizontal direction Z. The horizontal direction Z may be a direction of a length of the diving board 110. In some embodiments, the guide rail 111 may be a straight-line shape, a curved shape, L-shape, etc. In some embodiments, the diving board 110 may be retractable. Exemplary retractable diving board 110 may be found elsewhere (e.g., FIGS. 10-13 and relevant descriptions thereof) in the present disclosure.

The trolley 120 may be mounted to the diving board 110 via the guide rail 111, and move on the diving board 110 along the guide rail 111. In some embodiments, the trolley 120 may move horizontally on the diving board 110 along the guide rail.

In some embodiments, the trolley 120 may include one or more wheels. The one or more wheels may be arranged on the guide rail 111 of the diving board 110, and the trolley 120 may be mounted to the diving board 110 by the one or more wheels along the guide rail 111. In some embodiments, the trolley 120 may have two sides. The trolley 120 may include a plurality of wheels, and one or more of the plurality of wheels may be positioned on each of the two sides of the trolley 120.

Figure 3A:
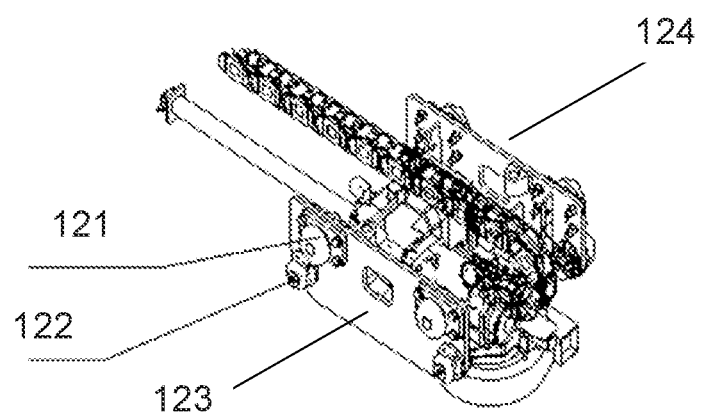
FIG. 3A illustrates an exemplary trolley according to some embodiments of the present disclosure.
Figure 3B:
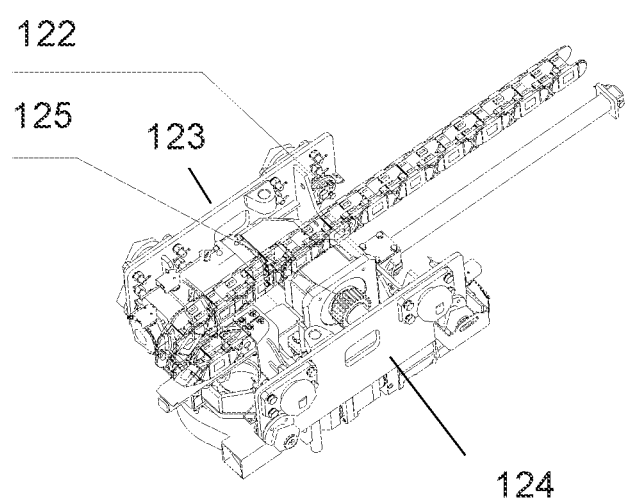
FIG. 3B illustrates an exemplary trolley according to some embodiments of the present disclosure.
Figure 4A:
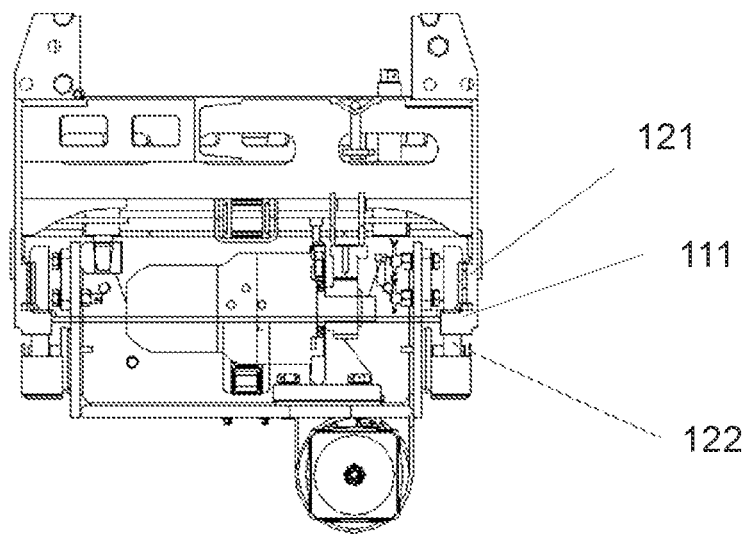
FIG. 4A illustrates an exemplary trolley according to some embodiments of the present disclosure.
Figure 4B:
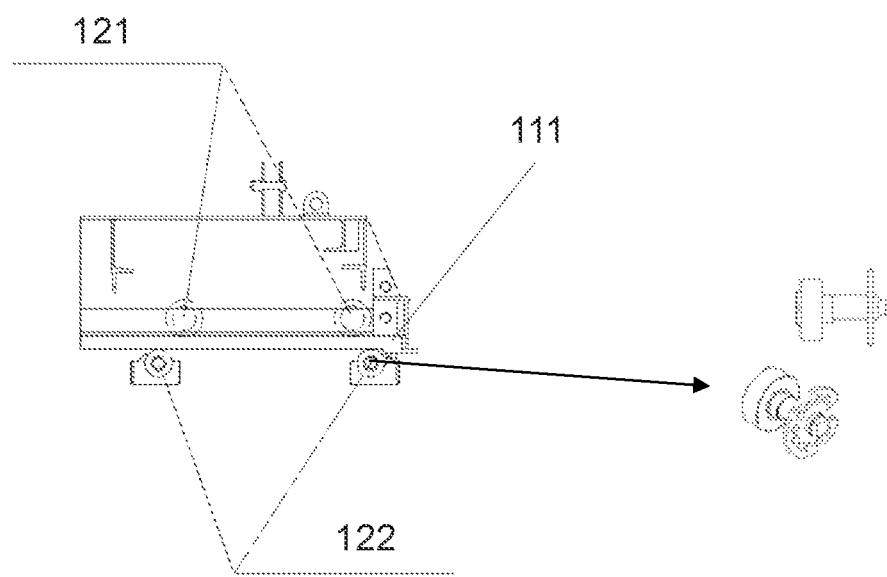
FIG. 4B illustrates an exemplary trolley according to some embodiments of the present disclosure.

FIGS. 3A-3B illustrate an exemplary trolley 120 according to some embodiments of the present disclosure, respectively. FIG. 4A illustrates an exemplary trolley 120 according to some embodiments of the present disclosure. FIG. 4B illustrates an exemplary trolley 120 according to some embodiments of the present disclosure. As shown in FIGS. 3A-3B and FIGS. 4A-4B, the trolley 120 may have two sides 123 and 124. The trolley 120 may include two pairs of combined bearings 121 and two pairs of eccentric wheels 122. As used herein, an eccentric wheel refers to a circular disk solidly fixed to a rotating axle with its center offset from that of the axle. The two sides 123 and 124 may be mounted to the guide rail 111 through the two pairs of combined bearings 121 and two pairs of eccentric wheels 122. The two pairs of combined bearings 121 and two pairs of eccentric wheels 122 may be configured to support the movement of the trolley 120 on the guide rail 111. In some embodiments, the two pairs of combined bearings 121 and/or the two pairs of eccentric wheels 122 may be configured to support the trolley 120, resist torsion, and/or bear torque during the pipe racking system 100 is gripping or transporting a tubular subject.

In some embodiments, each pair of combined bearings 121 may be positioned on each of the two sides 123 and 124 of the trolley 120. As shown in FIGS. 4A and 4B, each of the two pairs of combined bearings 121 may contact an upper surface and a side surface of the guide rail 111. In some embodiments, each pair of eccentric wheels 122 may be positioned on each of the two sides 123 and 124 of the trolley 120. As shown in FIGS. 4A and 4B, each of the two pairs of eccentric wheels 122 may contact a lower surface of the guide rail 111.

In some embodiments, the trolley 120 may be driven by a rack and pinion member to move relative to the diving board 110. The rack and pinion member may include a rack (not shown) and a pinion 125. In some embodiments, the rack may be arranged on the diving board 110. The pinion 125 may be arranged on the trolley 120. The pinion 125 may match the rack, and the trolley 120 may be driven by the rack and pinion member to move along the horizontal direction Z.

Figure 5A:
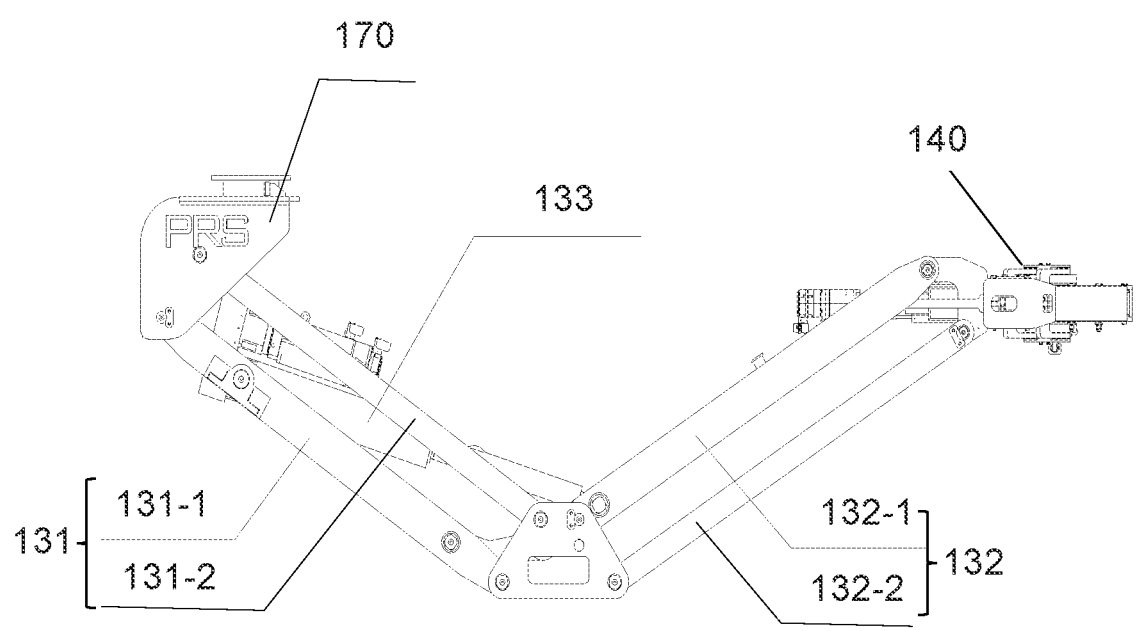
FIG. 5A illustrates an exemplary manipulator and an exemplary gripper according to some embodiments of the present disclosure.
Figure 5B:
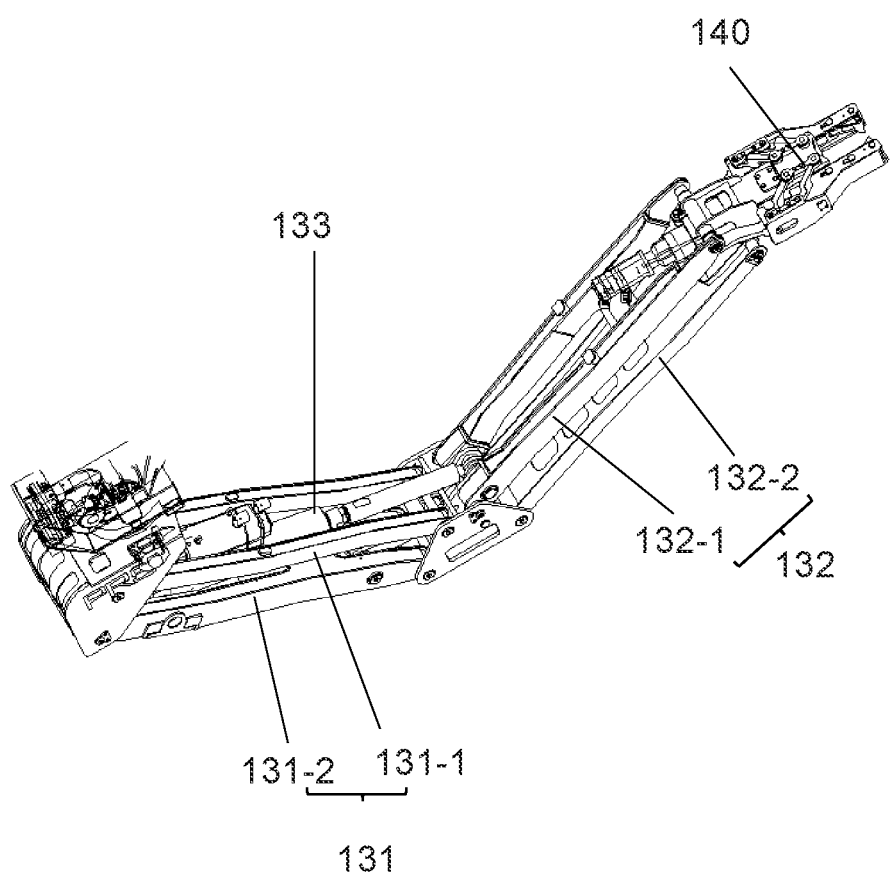
FIG. 5B illustrates an exemplary manipulator and an exemplary gripper according to some embodiments of the present disclosure.

The manipulator 130 may be connected to the trolley 120. For example, the manipulator 130 may be bolted to the trolley 120. As another example, the manipulator 130 may connected to the trolley 120 via a rotate support 170. An upper end of the rotate support 170 may be connected to the trolley 120, and the other end of the rotate support 170 may be connected to a back arm 131 of the manipulator 130. FIG. 5A and FIG. 5B illustrates an exemplary manipulator 130 and an exemplary gripper 140 according to some embodiments of the present disclosure, respectively. In some embodiments, the manipulator 130 may include a back arm 131 and a front arm 132. The back arm 131 may include a main back arm 131-1 and a vice back arm 131-2. The front arm 132 may include a main front arm 132-1 and a vice front arm 132-2. The rotate support 170 may be connected to each of the main back arm 131-1 and the vice back arm 131-2 via two pinned joints, respectively. As shown in FIG. 1, the manipulator 130 may be arranged at the bottom of the trolley 120. In some embodiments, a rotation of the manipulator 130 may be driven by a slewing mechanism (e.g., an actuating motor). The slewing mechanism may connect to the trolley 120 and the manipulator 131.

In some embodiments, the manipulator 130 may be rotatable, extendable, and retractable. The manipulator 130 may be configured to move the gripper 140 to a designated position. In some embodiments, the manipulator 130 may include one or more arms and one or more electric putters. The one or more electric putters may be configured to drive the one or more arms to move the gripper 140 to the designated position.

As shown in FIG. 5A and FIG. 5B, the manipulator 130 may further include a first electric putter 133. An end of the first electric putter 133 may be connected to the main back arm 131-1 of the main back arm 131, the other end of the first electric putter 133 may be connected to the main front arm 132-1 of the main front arm 132. The connection of the first electric putter 133 between the main back arm 131-1 and the main front arm 132-1 may be configured to support the main front arm 130 to increase stability and reduce jitter.

Figure 6:
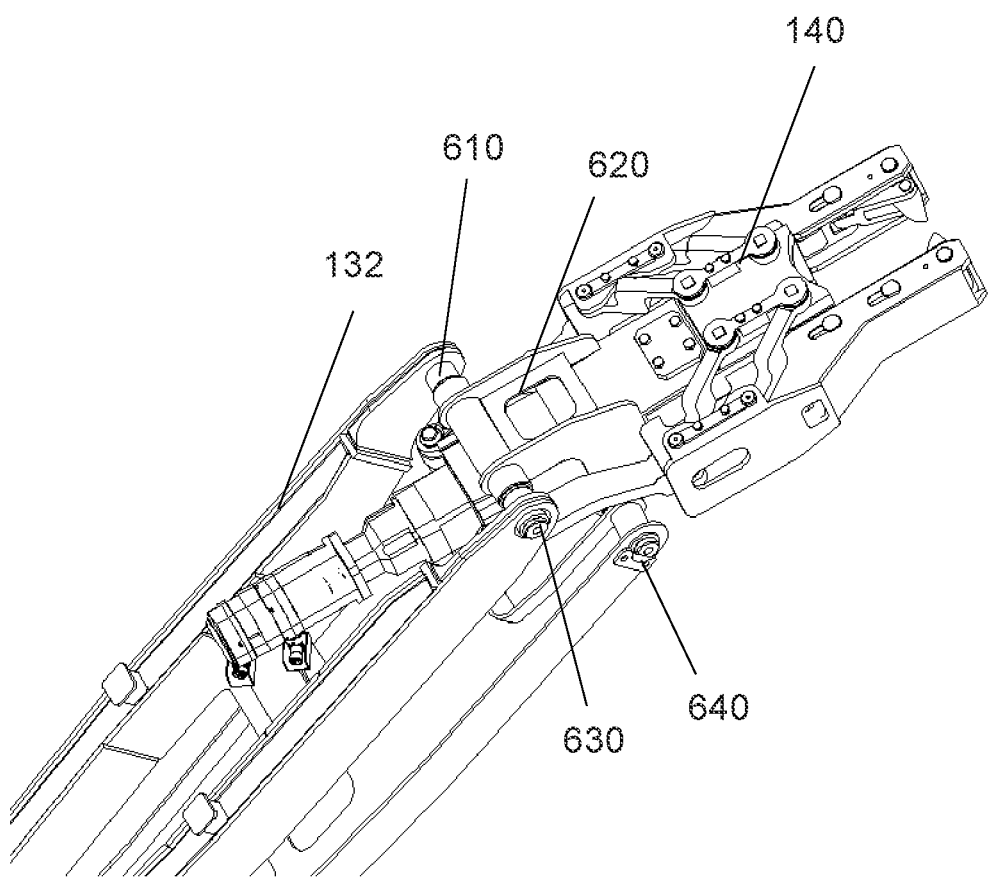
FIG. 6 illustrates an exemplary connection of a front arm and a gripper according to some embodiments of the present disclosure.

An end of the back arm 131 may be connected to the trolley 120, and the other end of the back arm 131 may be connected to an end of the front arm 131. The gripper 140 may be connected to an end of the front arm 132 away from the back arm 131. The connection and coordination of the back arm 131, the front arm 132, and the gripper 140 may enable the gripper 140 to move to a designated position. For example, the back arm 131 and the front arm 132, and the front arm 132 and the gripper 140 may be connected by a mechanical connection. Exemplary mechanical connections may include a key connection, a shaft pin connection, a threaded connection, or the like, or any combination thereof. Merely by way of example, FIG. 6 illustrates an exemplary connection of a front arm 132 and a gripper 140 according to some embodiments of the present disclosure. As shown in FIG. 6, the gripper 140 may be connected to the front arm 132 through four pin shafts 610-640.

In some embodiments, at least one of the back arm 131 and the front arm 132 may form a parallelogram structure. For example, as shown in the FIG. 5A, each of the back arm 131 and the front arm 132 may form a parallelogram structure. As another example, as shown in the FIG. 5B, each of the back arm 131 and the front arm 132 may form a double parallelogram structure.

The first electric putter 133 may be configured to drive the movement (e.g., extend, retract, etc.) of the back arm 131 and the front arm 132. In some embodiments, the first electric putter 133 may be connected to the front arm 132 and the back arm 131. An end of the first electric putter 133 connecting to the front arm 132 may be configured to support the front arm 132. For example, as shown in FIG. 5A and FIG. 5B, an end of the first electric putter 133 may be connected to an end the back arm 131 facing the trolley 120, and the other end of the first electric putter 133 may be connected to an end of the front arm 132 facing the back arm 131. As another example, an end of the first electric putter 133 may be connected to an end the back arm 131 facing the front arm 132, and the other end of the first electric putter 133 may be connected to an end of the front arm 132 away from the back arm 131.

The parallelogram structures or the double parallelogram structures of the back arm 131 and the front arm 132, the connection between the front arm 132 and the back arm 131 via the first electric putter 133, and the connection between the gripper 140 and the front arm 132 may be configured to limit the gripper 140 to move parallel to the diving board 110. In this way, unnecessary shakes are reduced, thereby improving the stability and reliability of the operation of the pipe racking system 100.

Figure 7:
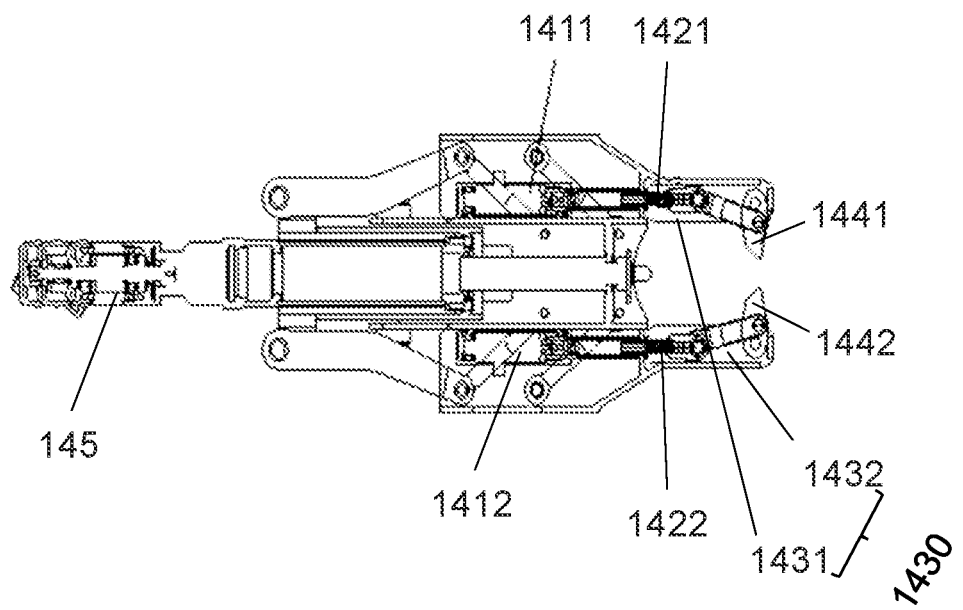
FIG. 7 illustrates an exemplary gripper according to some embodiments of the present disclosure.

The gripper 140 may be configured to grip a tubular subject. In some embodiments, the tubular subject may include a drill rod, a stand, a drill collar, a sleeve, or the like, or any combination thereof. FIG. 7 illustrates an exemplary gripper 140 according to some embodiments of the present disclosure. As shown in FIG. 7, the gripper 140 may include two second electric putters 1411 and 1412, two springs 1421 and 1422, a clamp assembly 1430, two opposing flippers 1441 and 1442, and a first actuating motor 145. The clamp assembly 1430 may include two fingers 1431 and 1432. The two fingers 1431 and 1432 and the two opposing flippers 1441 and 1442 may cooperate to grip the tubular subject. For example, the two fingers 1431 and 1432 may fit a diameter of the tubular subject, and the two opposing flippers 1441 and 1442 may enclose an opening of the two fingers 1431 and 1432. The two fingers 1431 and 1432 and the two opposing flippers 1441 and 1442 may grip the tubular subject.

The first actuating motor 145 may be configured to control a distance between the two fingers 1431 and 1432 of the clamp assembly 1430. The distance between the two fingers 1431 and 1432 may be determined based on the diameter of the tubular subject.

The two second electric putters 1411 and 1412, and the two springs 1421 and 1422 may be configured to control the two opposing flippers 1441 and 1442 to open or shut. For example, the two opposing flippers 1441 and 1442 may be connected to the two second electric putters 1411 and 1412, respectively. For example, as shown in FIG. 7, the flipper 1441 may be connected to one end of a push rod of the second electric putter 1411 by a connection mechanism (e.g., a linkage mechanism). The flipper 1442 may be connected to one end of a push rod of the second electric putter 1412 by a connection mechanism (e.g., a linkage mechanism). In some embodiments, the two second electric putters 1411 and 1412 may be combined into one second electric putter.

One end of each of the two springs 1421 and 1422 may be connected to a flipper of the two flippers 1441 and 1442, and the other end of the each spring may be connected to a push rod of a second electric putter of the two second electric putters 1411 and 1412. For example, as shown in FIG. 7, one end of the spring 1421 may be connected to the flipper 1441 and the other end of the spring 1421 may be connected to the push rod of the second electric putter 1411. One end of the spring 1422 may be connected to the flipper 1442 and the other end of the spring 1422 may be connected to the push rod of the second electric putter 1412.

The two fingers 1431 and 1432 may be connected to the two opposing flippers 1441 and 1442, respectively. In some embodiments, the finger 1431 may be connected to one end of the spring 1421 facing the flipper 1441. The finger 1432 may be connected to one end of the spring 1422 facing the flipper 1442.

In some embodiments, the first actuating motor 145 may control the two fingers 1431 and 1432 to form a certain opening. The distance between the two fingers 1431 and 1432 may fit the diameter of the tubular subject that is to be gripped or transported. The two second electric putters 1411 and 1412 may push the corresponding push rods and compress the two springs 1421 and 1422 to open the two flippers 1441 and 1442 to grip the tubular subject. After the tubular subject is gripped, the second electric putters 1411 and 1412 may control the two opposing flippers 1441 and 1442 to clamp the tubular subject by retracting the push rods of the two second electric putters 1411 and 1412 and restore the two springs 1421 and 1422. The retracting of the push rods of the two second electric putters 1411 and 1412 and the restoring the two springs 1421 and 1422 may prevent the gripped tubular subject from falling from the gripper 140, thereby ensuring the safety of the pipe racking system 100. The manipulator 130 may be rotatable, extendable, and/or retractable to transport the tubular subject to the designated position. After finishing transporting the tubular subject, the first actuating motor 145 may control the distance between the two fingers 1431 and 1432 to be increased. The two second electric putters 1411 and 1412 may push the corresponding push rods and compress the two springs 1421 and 1422 to open the two flippers 1441 and 1442, thereby the tubular subject being loosed.

In some embodiments, as shown in FIG. 2, the pipe racking system 100 may include a drag chain 150. The drag chain 150 may be connected to the diving board 110 and the trolley 120. The drag chain 150 may be configured to accommodate cables connected to the trolley 120 and the diving board 110. The drag chain 150 may move to guide and protect the cables. In some embodiments, during the movement of the trolley 120, a part of the drag chain 150 may be suspended without support. The pipe racking system 100 may further include a retractable pallet 160 configured to support part of the drag chain 150.

In some embodiments, the pipe racking system 100 may include a transport support assembly (not shown) for debug and transport the pipe racking system 100. More descriptions for the transport support assembly may be found elsewhere in the present disclosure. See, e.g., FIGS. 8, 9A, and 9B, and relevant descriptions thereof.

In some embodiments, the trolley 120 may be configured to arrive at different positions of the diving board 110 according to needs to perform different tasks. For example, the positions may include a maintenance position, a transport position, a waiting position, and a work position. More descriptions for the positions of the diving board 110 may be found elsewhere in the present disclosure. See, e.g., FIG. 14, and relevant descriptions thereof.

Figure 8:
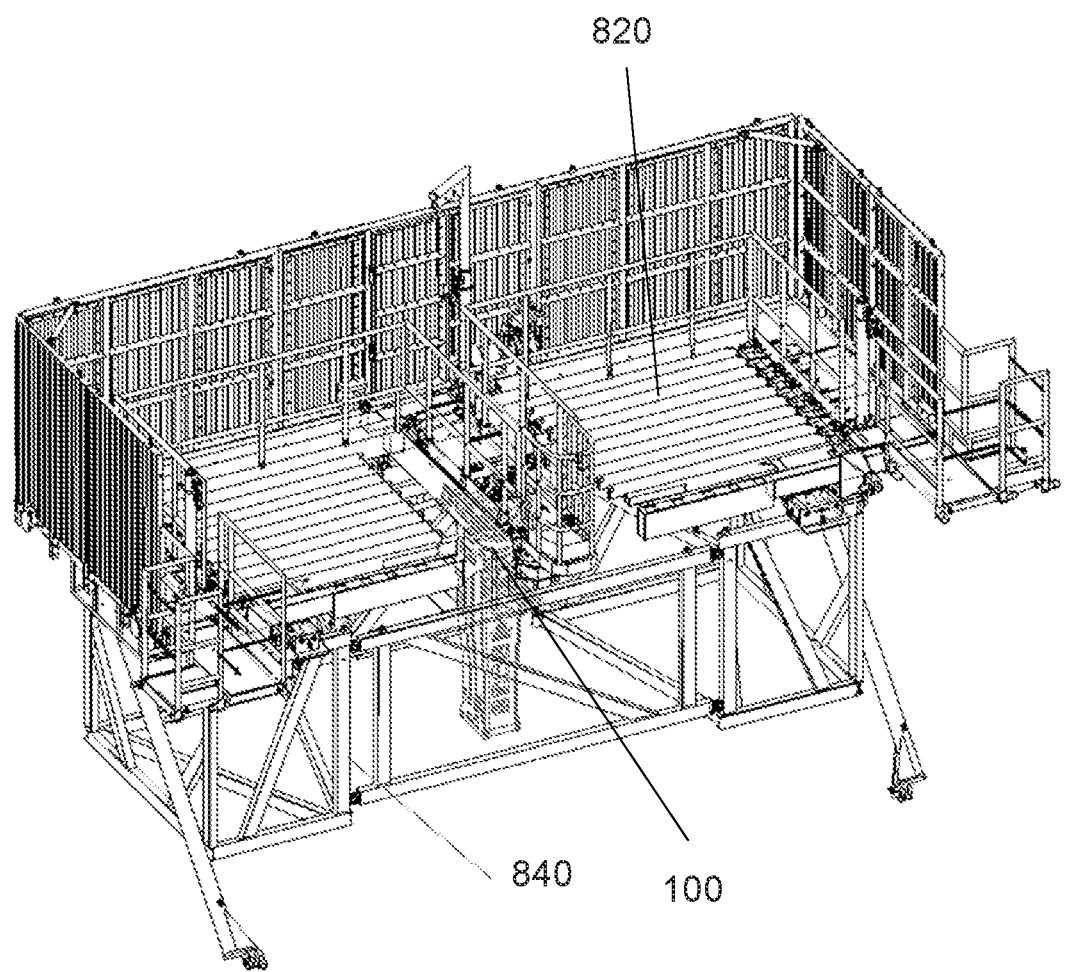
FIG. 8 illustrates an exemplary pipe racking system according to some embodiments of the present disclosure.

FIG. 8 illustrates an exemplary pipe racking system according to some embodiments of the present disclosure. As shown in FIG. 8, the pipe racking system 100 may further include a fingerboard assembly 820 and a transport support assembly 840.

The fingerboard assembly 820 may be arranged on both sides of the pipe racking system 100. The fingerboard assembly 820 may be configured to store tubular subjects. The pipe racking system 100 may grip and transport a tubular subject to another device (e.g., a top drive of a drilling system) from the fingerboard assembly 820. Alternatively, the pipe racking system 100 may grip and transport a tubular subject to the fingerboard assembly 820 from another device to store the tubular subject. For example, as shown in FIG. 8, the fingerboard assembly 820 may include a plurality of finger boards. The plurality of finger boards may be arranged on both sides of the pipe racker 810. The finger boards of each side of the pipe racking system 100 may be arranged in sequence along a direction parallel to the length of the diving board of the pipe racking system 100. There may be a gap between two adjacent finger boards. A tubular subject may be stored in the gap between two adjacent finger boards.

The transport support assembly 840 may be configured to debug and transport the pipe racking system 100 and the fingerboard assembly 820. For example, after the pipe racking system 100 and the fingerboard assembly 820 are assembled, the pipe racking system 100, and the fingerboard assembly 820 may be debugged and transported to a designated location via the transport support assembly 840.

Figure 9A:
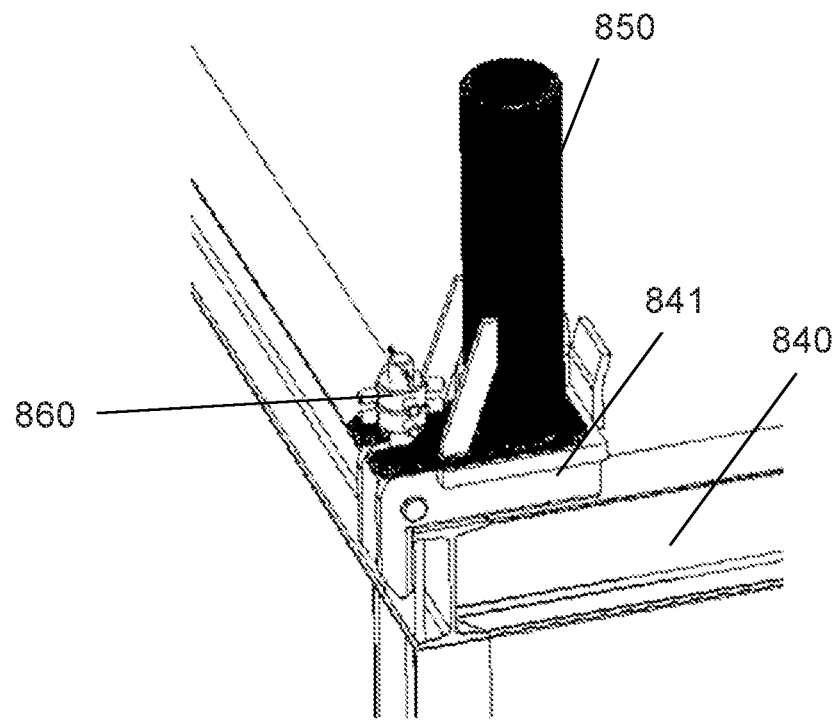
FIG. 9A illustrates an exemplary connection between a pipe racking system and a transport support assembly according to some embodiments of the present disclosure.
Figure 9B:
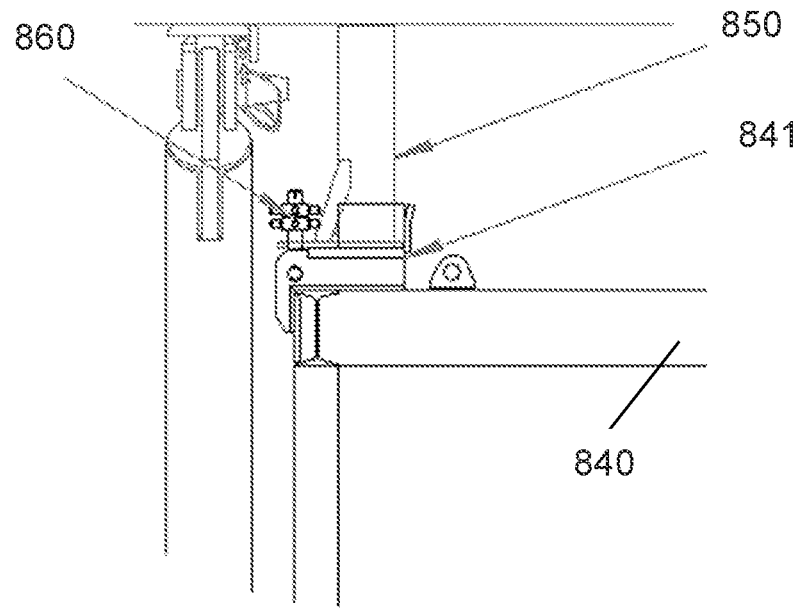
FIG. 9B illustrates an exemplary connection between a pipe racking system and a transport support assembly according to some embodiments of the present disclosure.

FIG. 9A and FIG. 9B illustrates an exemplary connection between a pipe racking system and a transport support assembly according to some embodiments of the present disclosure, respectively. As shown in FIG. 9A and FIG. 9B, one of a plurality of supporting components 850 of the pipe racking system 100 may connect to one of a plurality of connection components 841 of the transport support assembly 840. The plurality of connection components 841 may be arranged on the bottoms of the pipe racking system 100 and the fingerboard assembly 820. The plurality of connection components 841 may be arranged on the top of the transport support assembly 840. Each of the plurality of connection components 841 may be matched with one of the plurality of supporting components 850. During the transportation and debugging of the pipe racking system 100 and the fingerboard assembly 820, each of the plurality of supporting component 850 may be connected to a connection component 841 that matches the supporting component 850 by a mechanical connection. Exemplary mechanical connections may include a key connection, a shaft pin connection, a threaded connection, or the like, or any combination thereof. For example, as shown in FIG. 9A and FIG. 9B, each of the plurality of supporting component 850 may be connected to a connection component 841 that matches the supporting component 850 by a screw rod and nut assembly 860 (including a screw rod and a nut). After the pipe racking system 100, and the fingerboard assembly 820, are transported to the designated location via the transport support assembly 840, the screw rod and nut assemblies 860 may be disassembled, and the pipe racking system 100 and the fingerboard assembly 820 may be hoisted to a corresponding position.

Figure 10:
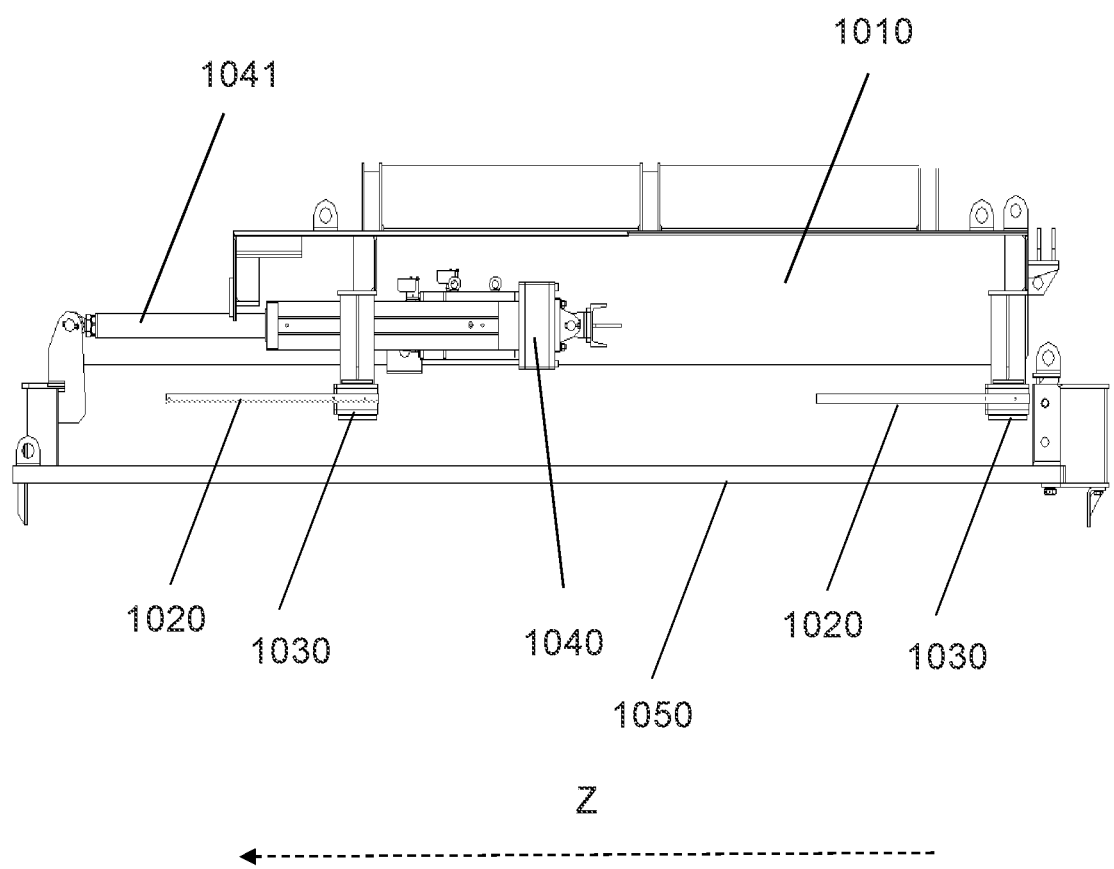
FIG. 10 illustrates an exemplary retractable diving board according to some embodiments of the present disclosure.

FIG. 10 illustrates an exemplary retractable diving board 1000 according to some embodiments of the present disclosure. In some embodiments, the retractable diving board 1000 may be an exemplary embodiment of the diving board 110 of the pipe racking system 100 described in FIG. 1. As shown in FIG. 10, the diving board 1000 may include a fixed part 1010, a pair of slideways 1020, a pair of sliders 1030, a third electric putter 1040, and a movement part 1050.

Figure 11A:
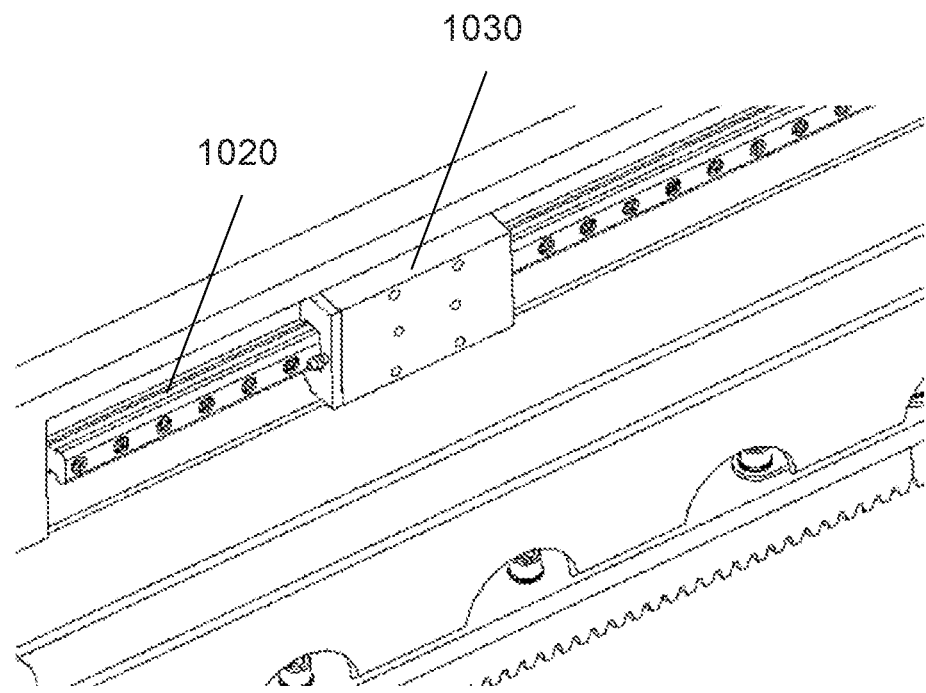
FIG. 11A illustrates an exemplary slider and an exemplary slideway according to some embodiments of the present disclosure.
Figure 11B:
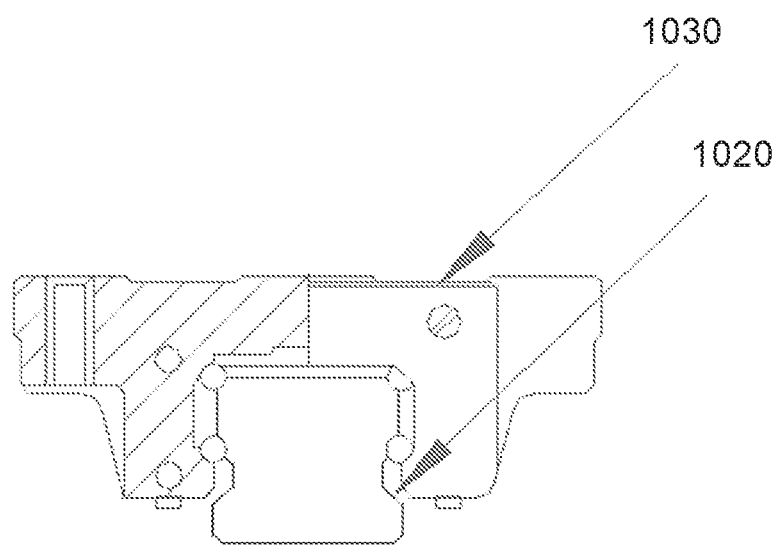
FIG. 11B illustrates an exemplary slider and an exemplary slideway according to some embodiments of the present disclosure.

The pair of sliders 1030 may be arranged two ends of the fixed part 1010 along the horizontal direction Z (the direction of a length of the retractable diving board 1000), respectively. The pair of sliders 1030 and the third electric putter 1040 may be connected to a side of the fixed part 1010 facing the movement part 1050. Each of the pair of sliders 1030 may be mounted to one of the pair of slideways 1020. The pair of sliders 1030 may be configured to support the pair of slideways 1020. For example, FIG. 11A illustrates an exemplary slider 1030 and an exemplary slideway 1020 according to some embodiments of the present disclosure. FIG. 11B illustrates an exemplary slider 1030 and an exemplary slideway 1020 according to some embodiments of the present disclosure. As shown in FIG. 11A and FIG. 11B, the slider 1030 may hold the slideway 1020 like a U shape. As shown in FIG. 11A, the pair of slideways 1020 may be connected to the movement part 1050. The third electric putter 1040 may include a push rod 1041. The push rod 1041 of the third electric putter 1040 may be connected to one end of the movement part 1050. The third electric putter 1040 may drive the movement of the movement part 1050 to extend or retract the diving board 1000.

Figure 12A:
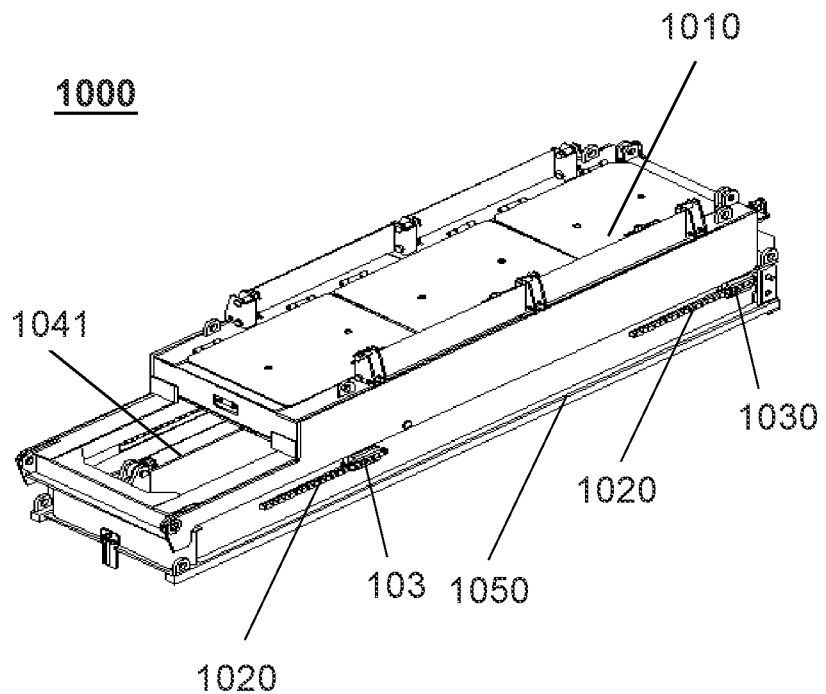
FIG. 12A illustrates an exemplary retractable diving board according to some embodiments of the present disclosure.
Figure 12B:
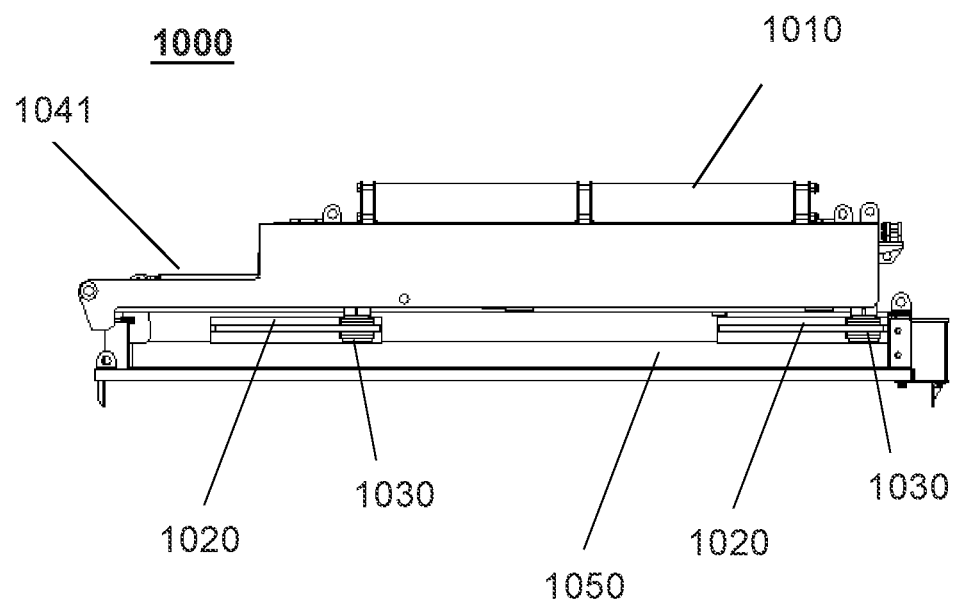
FIG. 12B illustrates an exemplary retractable diving board in FIG. 12A according to some embodiments of the present disclosure.

For example, when the push rod 1041 of the third electric putter 1040 extends along the horizontal direction Z, the pair of slideways 1020 may move on the pair of sliders 1030 along the horizontal direction Z to cause the movement part 1050 to move along the horizontal direction Z, thereby retracting the retractable diving board 1000. FIG. 12A illustrates an exemplary retractable diving board 1000 according to some embodiments of the present disclosure. FIG. 12B illustrates an exemplary retractable diving board 1000 in FIG. 12A according to some embodiments of the present disclosure. As shown in FIG. 12A and FIG. 12B, the push rod 1041 of the third electric putter 1040 extends along the horizontal direction Z to the far left, and the pair of slideways 1020 moves on the pair of sliders 1030 to the far left along the horizontal direction Z, thereby causing the retractable diving board 1000 to retract entirely along the horizontal direction Z.

Figure 13A:
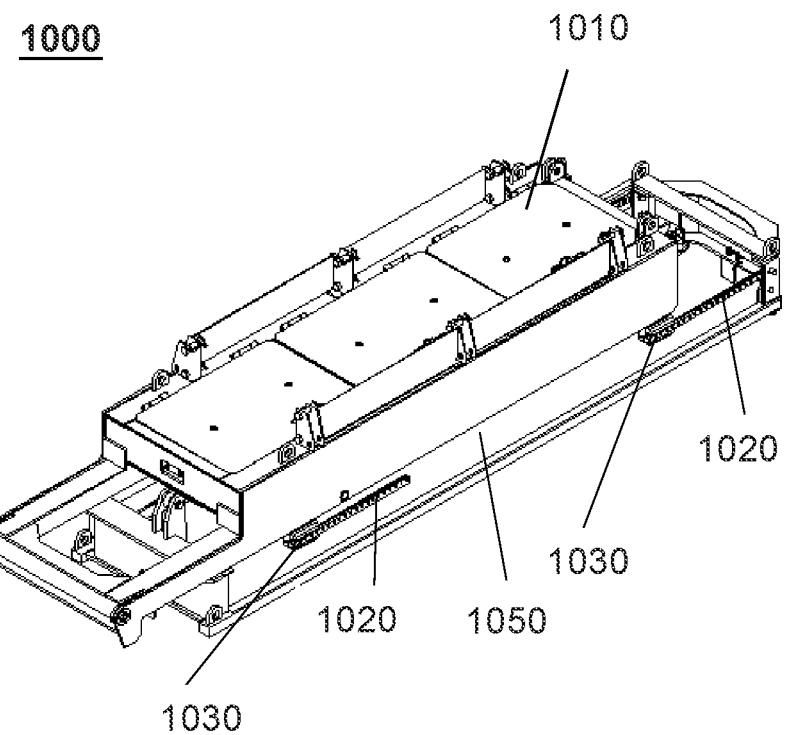
FIG. 13A illustrates an exemplary retractable diving board 1000 according to some embodiments of the present disclosure.
Figure 13B:
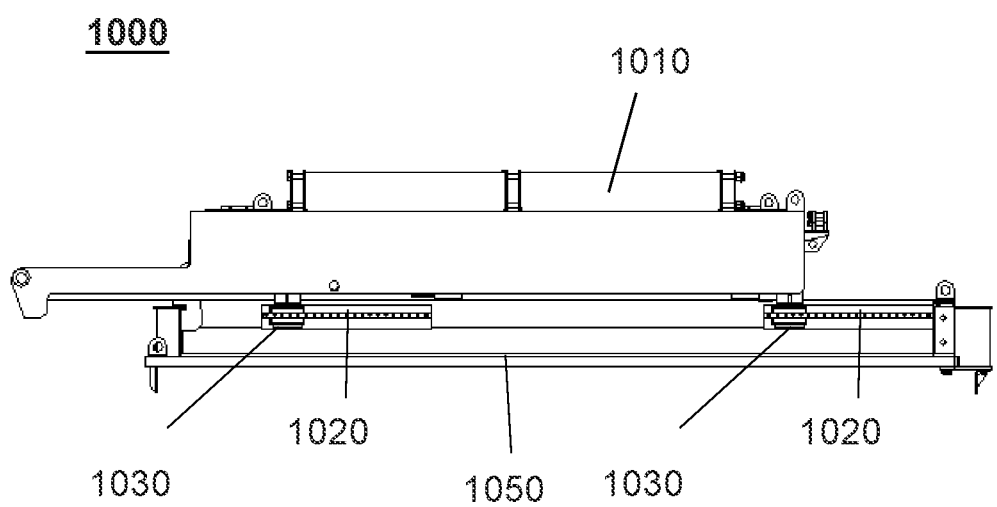
FIG. 13B illustrates an exemplary retractable diving board in FIG. 13A according to some embodiments of the present disclosure.

As another example, when the push rod 1041 of the third electric putter 1040 retracts along an opposite direction of the horizontal direction Z, the pair of slideways 1020 may move on the pair of sliders 1030 along the horizontal direction Z to cause the movement part 1050 to move along the opposite direction of the horizontal direction Z, thereby extending the retractable diving board 1000. FIG. 13A illustrates an exemplary retractable diving board 1000 according to some embodiments of the present disclosure. FIG. 13B illustrates an exemplary retractable diving board 1000 in FIG. 13A according to some embodiments of the present disclosure. As shown in FIG. 13A and FIG. 13B, the push rod 1041 of the third electric putter 1040 retracts along the opposite direction of the horizontal direction Z to the far right, and the pair of slideways 1020 moves on the pair of sliders 1030 to the far right along the opposite direction of the horizontal direction Z, thereby causing the retractable diving board 1000 to extend entirely the opposite direction of along the horizontal direction Z.

Some interferences may be effectively avoided by configuring the retractable diving board 1000 for the pipe racking system 100. Taking the pipe racking system 100 is used in a drilling system for gripping and transporting a tubular drill as an example, the drilling system may include a top drive to drive the tubular drill to move up or down. The retractable diving board 1000 may be arranged near the top drive (e.g., the right of retractable diving board 1000 shown in FIG. 10) so that the tubular drill may be transported to the top drive by the pipe racking system 100, and the top drive may control the tubular drill down for drilling along a vertical direction. When the top drive is driving the tubular drill to move up or down, the retractable diving board 1000 may be retracted along the direction (e.g., the left of retractable diving board 1000 shown in FIG. 10) away from the top drive to avoid interference with the top drive.

Figure 14:
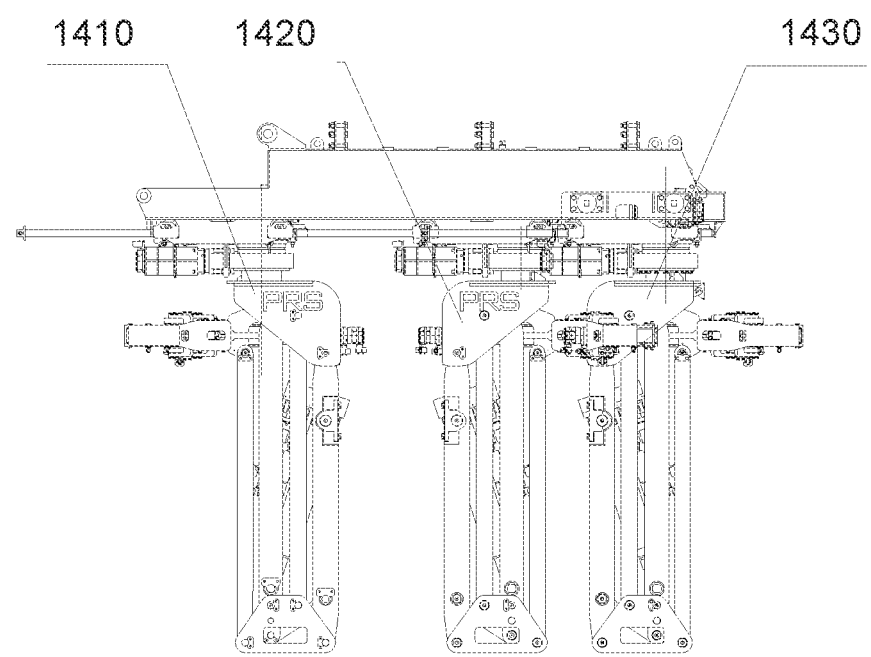
FIG. 14 illustrates exemplary positions of a trolley according to some embodiments of the present disclosure.

FIG. 14 illustrates exemplary positions of a trolley according to some embodiments of the present disclosure. In some embodiments, the trolley 120 may be configured to arrive at four positions of the diving board 110 according to needs to perform different tasks. As shown in FIG. 14, the four positions may include a maintenance position 1410, a transport position 1420, a waiting position 1430, and a work position (not shown).

The maintenance position 1410 may be configured to maintain the pipe racking system 100. For example, if one or more components of the pipe racking system 100 are abnormal or broken, the trolley may move to the maintenance position 1410 along the guide rail 111 of the diving board 110. The pipe racking system 100 may be maintained at the maintenance position 1410.

The transport position 1420 may be configured for transporting the pipe racking system 100. For example, the trolley may be at the transport position 1420 when the pipe racking system 100 is being transported. In some embodiments, the pipe racking system 100 may be transported via a transport apparatus (e.g., the transport support assembly 840 described in FIG. 8) at the transport position 1420. For example, when the pipe racking system 100 needs to be transported, the trolley 120 may move to the transport position 1420 along the guide rail 111 of the diving board 110, and the pipe racking system 100 may be transported to a designated location via the transport support assembly 840.

The waiting position 1430 may be a position where the pipe racking system 100 is waiting to work. For example, during a tubular subject (e.g., a tubular drill) is working (e.g., moving up or down), the trolley may move to the waiting position 1430 along the guide rail of the diving board to avoid interference with the movement of the tubular subject. Once the tubular subject finishes working (e.g., the tubular subject stops moving up and down), the pipe racking system 100 may enter into the work position from the waiting position 1430.

The work position may be configured for gripping and transporting the tubular subject. For example, the trolley may move to the work position along the guide rail of the diving board, so that the pipe racking system 100 may transport the tubular subject to a storage position of the tubular subject after the tubular subject finishes working. As another example, the trolley may move to the work position along the guide rail of the diving board, so that the pipe racking system 100 may grip the tubular subject from the storage position of the tubular subject, and transport the tubular subject to a target position.

Figure 15:
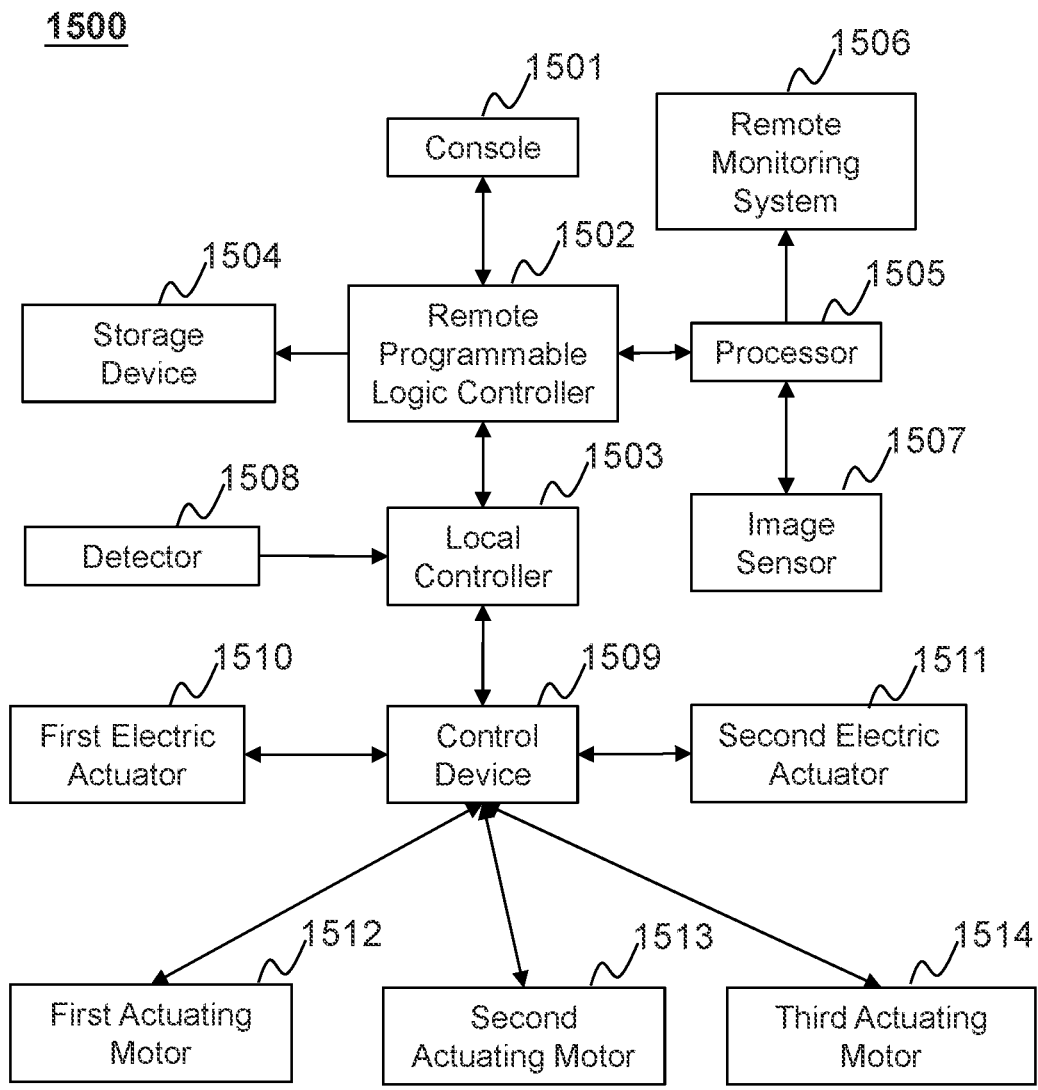
FIG. 15 is a schematic diagram illustrating an exemplary device control system of a pipe racking system according to some embodiments of the present disclosure.

FIG. 15 is a schematic diagram illustrating an exemplary device control system 1500 of a pipe racking system (e.g., the pipe racking system 100 described in FIG. 1) according to some embodiments of the present disclosure. As shown in FIG. 15, the device control system 1500 may include a console 1501, a remote programmable logic controller (PLC) 1502, a local controller 1503, at least one storage device 1504, at least one processor 1505, a remote monitoring system 1506, at least one image sensor 1507, at least one detector 1508, at least one control device 1509, a first electric putter 1510, a second electric putter 1511, a first actuating motor 1512, a second actuating motor 1513, and a third actuating motor 1514.

In some embodiments, a plurality of components of the device control system 1500 may be connected to and/or communicate with each other via a wireless connection, a wired connection, or a combination thereof. For example, the remote PLC 1502 may be connected to and/or communicate with the console 1501, the local controller 1503, and/or the at least one processor 1505 via a wireless connection, a wired connection, or a combination thereof.

The console 1501 may be a computing device for implementing human-computer interaction between the pipe racking system 100 and a user (e.g., an engineer) thereof. The remote PLC 1502 may process data and/or information obtained from the console 1501, the local controller 1503, and the at least one processor 1505. For example, the remote PLC 1502 may access and process information and/or data from the local controller 1503, and transmit the information and/or data from the local controller 1503 to the console 1501. The console 1501 may receive the information and/or data from the remote PLC 1502. A user (e.g., an engineer) may send instructions through the console 1501 to control the pipe racking system 100 to perform one or more operations.

In some embodiments, the remote PLC 1502 may include one or more processing engines (e.g., single-core processing engine(s) or multi-core processor(s)). Merely by way of example, the one or more processing engines may include one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

The at least one image sensor 1507 may be configured to capture an image or a video of a movable component of the pipe racking system 100. The at least one image sensor 1507 may include a camera, a radar device, an infrared imaging device, or the like, or any combination thereof. The movable component of the pipe racking system 100 may be any moveable accessory of the pipe racking system 100. For example, the movable component may include the diving board 110, the gripper 140, the manipulator 130, the trolley 120, the clamp assembly 1430 of the gripper 140, the fingers 1431 and 1432, the flippers 1441 and 1442, or the like, or any combination thereof.

The at least one processor 1505 may be configured to determine a state and/or a position of the movable component based on the image or the video of the movable component captured by the at least one image sensor 1507. The at least one processor 1505 may send the determined state and/or the position of the movable component to the remote PLC 1502. In some embodiments, the remote PLC 1502 may store the image, the video, the state, and/or the position of the movable component into the storage device 1504. In some embodiments, the remote PLC 1502 may send the image, the video, the state, and/or the position of the movable component to the console 1501. The user (e.g., an engineer) of the pipe racking system 100 may obtain the state, and/or the position of the movable component from the console 1501, and transmit an instruction for controlling the at least one image sensor 1507 to the remote monitoring system 1506. In some embodiments, the user may monitor the state of the movable component by the remote monitoring system 1506.

The at least one storage device 1504 may be configured to store data, instructions, and/or any other information relating to the pipe racking system 100. For example, the at least one storage device 1504 may store the image, the video, the state, and/or the position of the movable component. In some embodiments, the at least one storage device 1504 may include a mass storage device, a removable storage device, a volatile read-and-write memory, a read-only memory (ROM), or the like, or any combination thereof. Exemplary mass storage devices may include a magnetic disk, an optical disk, a solid-state drive, etc. Exemplary removable storage devices may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc.

The at least one detector 1508 may be configured to detect an operating status of one or more components of the pipe racking system 100. For example, the at least one detector 1508 may detect whether the operating of a component (e.g., the diving board 110, the trolley 120, the manipulator 130, or the gripper 140, etc.) of the pipe racking system 100 is abnormal or broken. The at least one detector 1508 may send a detected signal to the local controller 1503. For example, if the at least one detector 1508 detects that the operating of a component of the pipe racking system 100 is abnormal, the detector 1508 may send an alarm signal to the local controller 1503. The local controller 1503 may send an alarm to remind the user.

The at least one control device 1509 may be configured to control at least one motor. The at least one control device 1509 may be connected to the local controller 1503. The user may control the at least one control device 1509 via the local controller 1503. In some embodiments, the at least one motor may control the movement of the movable component based on the state of a movable component. The at least one motor may include the first electric putter 1510, the second electric putter 1511, the first actuating motor 1512, the second actuating motor 1513, the third actuating motor 1514. The first electric putter 1510 may be configured to drive the movement (e.g., extend, retract, etc.) of the manipulator 130 based on the state of the manipulator 130. The second electric putter 1511 may be configured to control the two opposing flippers 1441 and 1442 to open or shut based on the state of the two opposing flippers 1441 and 1442. The first actuating motor 1512 may be configured to control a rotation of the manipulator 130 based on the state of the manipulator 130. The second actuating motor 1513 may be configured to control a movement of the trolley 120 based on the state of the trolley 120. The third actuating motor 1514 may be configured to control a distance between the two fingers 1431 and 1432 of the clamp assembly 1430 based on the state of the two fingers 1431 and 1432 of the clamp assembly 1430. It should be noted that the term "electric putter" and the term "actuating motor" may be used interchangeably to describe a motor for driving a movement of a component.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer-readable media having computer-readable program code embodied thereon.

A non-transitory computer-readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer-readable signal medium may be any computer-readable medium that is not a computer-readable storage medium and that may communicate, propagate, or transport a program for use by or in connection with an instruction execution system, apparatus, or device. Program code embodied on a computer-readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran, Per, COBOL, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof to streamline the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate" or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable. The terms "first," "second," "third," "fourth," etc. as used herein are meant as labels to distinguish among different elements and may not necessarily have an ordinal meaning according to their numerical designation.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A pipe racking system, comprising:
   a diving board having a guide rail;
   a trolley having two sides, being mounted to the diving board via the guide rail, and being driven by a rack and pinion member, wherein the trolley includes:
      two pairs of combined bearings, each pair of combined bearings being positioned on each of the two sides of the trolley, each of the two pairs of combined bearings contacting an upper surface and a side surface of the guide rail; and
      two pairs of eccentric wheels, each pair of eccentric wheels being positioned on each of the two sides of the trolley, each of the two pairs of eccentric wheels contacting a lower surface of the guide rail;
   a manipulator connected to the trolley; and
   a gripper being connected to an end of the manipulator away from the trolley and configured to grip a tubular subject, wherein the gripper includes:
      two opposing flippers;
      two first electric putters configured to control the two flippers; and
      two springs, wherein one end of each spring of the two springs is connected to a flipper of the two flippers and the other end of the each spring is connected to a push rod of a first electric putter of the two first electric putters.

2. The pipe racking system of claim 1, wherein the manipulator includes:
   a back arm;
   a front arm connected to the back arm and the gripper; and
   a second electric putter connected to the front arm and the back arm, wherein an end of the second electric putter connecting to a main back arm of the back arm and the other end of the second electric putter connecting to a main front arm of the front arm.

3. The pipe racking system of claim 2, wherein the connection between the front arm and the back arm via the second electric putter and the connection between the gripper and the front arm are configured to limit the gripper to move parallel to the diving board.

4. The pipe racking system of claim 3, wherein the gripper is connected to the front arm through four pin shafts.

5. The pipe racking system of claim 1, wherein the diving board is retractable.

6. The pipe racking system of claim 5, further comprising:
   a drag chain connected to the diving board and the trolley, wherein the drag chain is configured to guide and protect cables connected to the trolley; and
   a retractable pallet configured to support part of the drag chain.

7. The pipe racking system of claim 1, wherein the manipulator is bolted to the trolley.

8. The pipe racking system of claim 1, wherein a rotation of the manipulator is driven by a slewing mechanism.

9. The pipe racking system of claim 1, further comprising:
   at least one image sensor for capturing an image of a movable component of the pipe racking system; and
   at least one processor for determining a state of the movable component.

10. The pipe racking system of claim 9, further comprising:
    at least one storage device for storing the image or the state of the movable component.

11. The pipe racking system of claim 9, further comprising:
    at least one control device for controlling at least one motor, the at least one motor controlling a movement of the movable component based on the state of the movable component.

12. The pipe racking system of claim 9, wherein the movable component of the pipe racking system includes at least one of:
    the gripper,
    the manipulator;
    the trolley; or
    a clamp assembly of the gripper, wherein the clamp assembly including two fingers, and the two fingers and the two opposing flippers are configured to grip the tubular subject.

13. The pipe racking system of claim 12, wherein the at least one motor includes at least one of:
    the first electric putter;
    the second electric putter;
    a first actuating motor for controlling a rotation of the manipulator,
    a second actuating motor for controlling a movement of the trolley; or
    a third actuating motor for controlling a distance between the two fingers of the clamp assembly.

14. The pipe racking system of claim 1, further comprising a transport support assembly for debug and transport the pipe racking system.

15. The pipe racking system of claim 1, wherein the trolley is configured to arrive at four positions of the diving board, the four positions including:
    a maintenance position for maintaining the pipe racking system;

a transport position for transporting the pipe racking system;

a waiting position for waiting to work; and a work position for gripping and transporting the tubular subject.

16. A pipe racking system, comprising:

a diving board having a guide rail;

a trolley having two sides, being mounted to the diving board via the guide rail, wherein the trolley includes:

two pairs of combined bearings, each pair of combined bearings being positioned on each of the two sides of the trolley, each of the two pairs of combined bearings contacting an upper surface and a side surface of the guide rail; and two pairs of eccentric wheels, each pair of eccentric wheels being positioned on each of the two sides of the trolley, each of the two pairs of eccentric wheels contacting a lower surface of the guide rail;

a manipulator connected to the trolley, wherein the manipulator includes:

a back arm;

a front arm connected to the back arm and the gripper; and a first electric putter connected to the front arm and the back arm, wherein an end of the first electric putter connecting to a main back arm of the back arm and the other end of the second electric putter connecting to a main front arm of the front arm;

a gripper being connected to an end of the manipulator away from the trolley and configured to grip a tubular subject, wherein the gripper includes:

two opposing flippers;

two second electric putters configured to control the two flippers; and two springs, wherein one end of each spring of the two springs is connected to a flipper of the two flippers and the other end of the each spring is connected to a push rod of a second electric putter of the two second electric putters, wherein the connection between the front arm and the back arm via the first electric putter and the connection between the gripper and the front arm are configured to limit the gripper to move parallel to the diving board;

at least one image sensor for capturing an image of a movable component of the pipe racking system; and at least one processor for determining a state of the movable component.

17. The pipe racking system of claim 16, wherein the movable component of the pipe racking system includes at least one of:

the gripper;

the manipulator;

the trolley; or a clamp assembly of the gripper, wherein the clamp assembly including two fingers, and the two fingers and the two opposing flippers are configured to gripping the tubular subject.

18. The pipe racking system of claim 16, wherein the diving board is retractable, and the pipe racking system further comprises:

a drag chain connected to the diving board and the trolley, wherein the drag chain is configured to guide and protect cables connected to the trolley; and a retractable pallet configured to support part of the drag chain.

19. The pipe racking system of claim 16, wherein the trolley is configured to arrive at four positions of the diving board, the four positions including:

a maintenance position for maintain the pipe racking system;

a transport position for transporting the pipe racking system;

a waiting position for waiting to work; and a work position for gripping and transporting the tubular subject.

20. A drill system, comprising a pipe racking system, wherein the pipe racking system comprises:

a diving board having a guide rail;

a trolley having two sides, being mounted to the diving board via the guide rail, and being driven by a rack and pinion member, wherein the trolley includes:

two pairs of combined bearings, each pair of combined bearings being positioned on each of the two sides of the trolley, each of the two pairs of combined bearings contacting an upper surface and a side surface of the guide rail; and two pairs of eccentric wheels, each pair of eccentric wheels being positioned on each of the two sides of the trolley, each of the two pairs of eccentric wheels contacting a lower surface of the guide rail;

a manipulator connected to the trolley; and a gripper being connected to an end of the manipulator away from the trolley and configured to grip a tubular subject, wherein the gripper includes:

two opposing flippers;

two first electric putters configured to control the two flippers; and two springs, wherein one end of each spring of the two springs is connected to a flipper of the two flippers and the other end of the each spring is connected to a push rod of a first electric putter of the two first electric putters.

\* \* \* \* \*